F. A. STRONG.
TIRE REPAIR DEVICE.
APPLICATION FILED MAR. 1, 1912.
1,030,032.
Patented June 18, 1912.
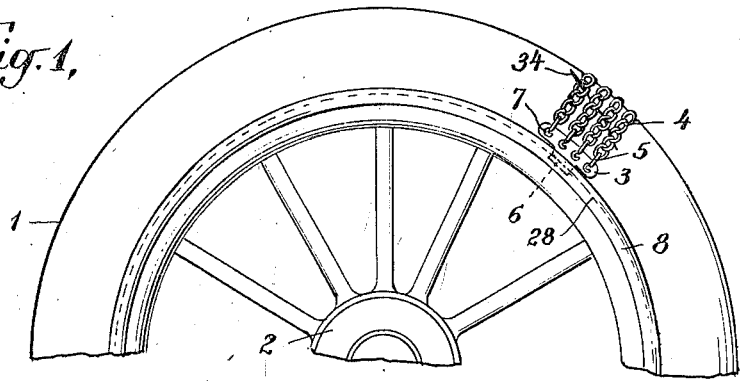
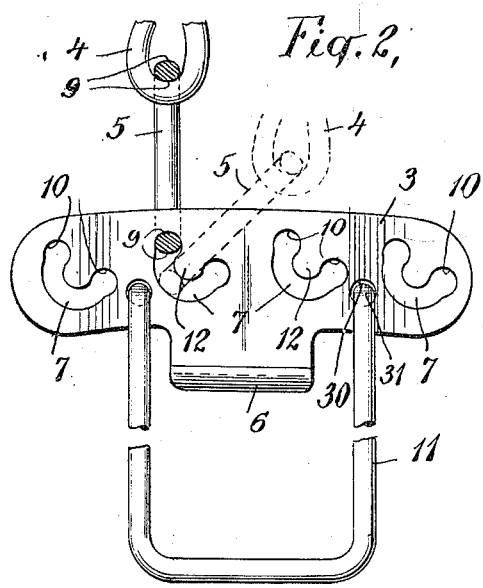
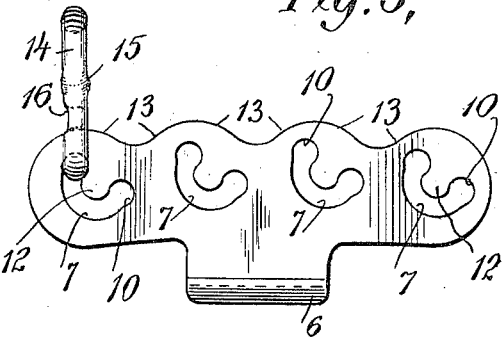
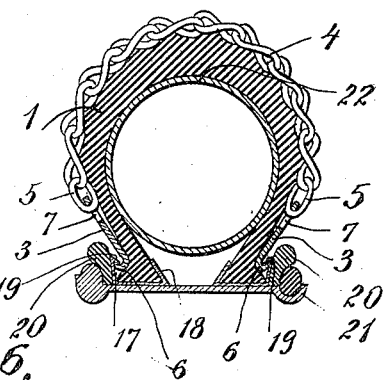
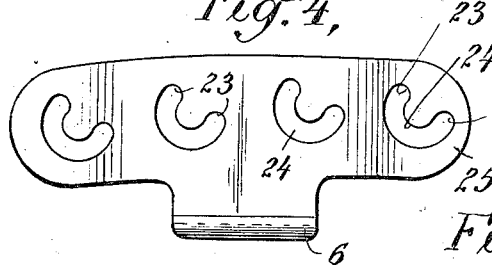
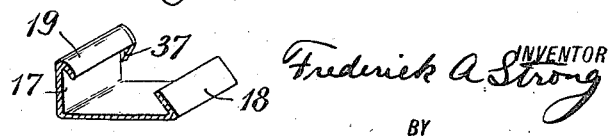
WITNESSES
Jessie B. Kay.
Charles Eberhart.
INVENTOR
Frederick A. Strong
BY
Duncan & Duncan ATTORNEYS

UNITED STATES PATENT OFFICE.

FREDERICK A. STRONG, OF BRIDGEPORT, CONNECTICUT, ASSIGNOR TO WEED CHAIN TIRE GRIP COMPANY, OF NEW YORK, N. Y., A CORPORATION OF NEW YORK.

TIRE-REPAIR DEVICE.

1,030,032.  Specification of Letters Patent.  Patented June 18, 1912.

Application filed March 1, 1912. Serial No. 680,965.

*To all whom it may concern:*

Be it known that I, FREDERICK A. STRONG, a citizen of the United States, and resident of Bridgeport, Fairfield county, Connecticut, have made a certain new and useful Invention Relating to Tire-Repair Devices, of which the following is a specification, taken in connection with the accompanying drawing, which forms part of the same.

This invention relates especially to tire repair devices comprising anchor plates preferably having central holding hooks coöperating with the clencher rim or other part of the pneumatic tire and having a series of flexible securing chains adjustably secured to said plates and adapted to embed themselves sufficiently in the pneumatic tire to securely hold it in position adjacent the puncture or blowout, there being preferably a series or curved dumb bell attaching slots in said anchor plates with which attaching link members coöperate so as to adjust the effective length of the securing members.

In the accompanying drawing showing illustrative embodiments of this invention in a somewhat diagrammatic way, Figure 1 shows a repair device as applied to a pneumatic tire. Fig. 2 is an enlarged detail view of an anchor plate and connected parts. Fig. 3 is a similar view of another form of anchor plate. Fig. 4 is a similar view of a still further modified form of anchor plate. Fig. 5 is a transverse section through a tire to which a device is attached. Fig. 6 is a detail of part of this device.

In the illustrative embodiment of the invention shown in Figs. 1 and 2, the anchor plates 3 which are preferably curved to substantially conform with the sides of the tire may as indicated be provided with a central relatively narrow holding hook 6 adapted to engage the inturned flange 28 of the clencher rim 8 and the tire shoe 1 mounted on the wheel 2. It is sometimes desirable to provide a special attaching device, such as the attaching loop 11, which may as shown in Fig. 2 have the inturned ends 31 adapted to coöperate with suitable holes 30 in the anchor plate so that when inserted therein the attaching loop may be forcibly drawn downward by any convenient tool so as to force the holding hook into locking position in coöperation with the clencher flange or other part. The attaching loop may then be readily disengaged and be similarly used to force into locking position the anchor plate secured in any desired way to the other ends of the securing chains 4 which are thus brought into firm holding engagement with the tire. When the repair device has been thus applied to the tire over a weakened portion or puncture 34 in connection, if desired, with an internal patch or shoe the tire is inflated in the usual way and the securing chains thus become firmly embedded in the tire shoe so as not to project to an undesirable extent beyond the normal tread surface and at the same time greatly minimize working or movement of the parts under service conditions.

The securing chains 4 may as indicated be of ordinary curb chain or preferably of machine made curb chain having accurately sized hardened links and any desired number of these securing chains may be conveniently connected with the anchor plates by suitable attaching link members which may coöperate with curved attaching slots in the plates. As indicated in Fig. 2, the attaching slots may be given a dumb bell shape and be formed with enlarged bearing apertures 10 while the curved connecting portion 7 of the slot is relatively narrow because of the somewhat enlarged head 12 projecting thereinto. The attaching link members 5 which are preferably welded or otherwise permanently secured in closed position may be formed with suitable bearing portions 9 so as to properly coöperate with either of the bearing apertures and any desired portion of these attaching link members, such as the bearing portions 9, may be sufficiently narrow so as to pass through the curved connecting portions of the attaching slots when for the purposes of adjustment the attaching members are moved to the other ends of these slots. This may be readily accomplished by swinging the attaching link into the dotted position indicated in Fig. 5 so as to allow the narrow bearing or adjusting portion of the attaching link to pass edgewise through the narrow connecting portion of the attaching slot and be retained in position in coöperation with the lower enlarged bearing aperture so as to correspondingly shorten the effective length of this securing chain. In this way accidental displacement of the attaching links is minimized or prevented while at the same time the links may be readily and quickly adjusted so as to shorten the effective length of the securing chains by an eighth or a quarter of an inch and secure their proper coöperation with tires of different size.

Fig. 3 shows another form of anchor plate which may be provided with similarly curved dumb bell attaching slots 7 having the relatively enlarged bearing apertures 10 with which may coöperate the adjusting links 14 which may as indicated have the welded portions 15. By forming a suitable adjusting recess, such as 16, in the side and taching link members permanently secured at the ends of each of said securing chains and having flattened narrowed bearing portions coöperating with the enlarged bearing apertures at each end of said attaching slots to normally hold each of said attaching link members in adjusted position while permitting said attaching link members to be moved into the opposite bearing portions of each of said attaching slots to adjust the effective length of said securing chains.

2. The tire repair device comprising a pair of rigid anchor plates curved to coning slots, curb securing chains, and attaching link members permanently connecting the ends of each of said securing chains to said anchor plates, said attaching link members comprising bearing portions coöperating with the enlarged bearing apertures in said attaching slots and comprising narrow adjusting portions to pass edgewise through the narrow connecting portions of said attaching slots to adjust the effective length of said securing chains.

6. The tire repair device comprising a pair of anchor plates each provided with a central holding hook adapted to be secured to the wheel rim adjacent the sides of a pneumatic tire, one at least of said anchor plates being formed with dumb bell attaching slots, securing chains, and attaching link members connecting the ends of each of said securing chains to said anchor plates, said attaching link members comprising bearing portions coöperating with the enlarged bearing apertures in said attaching slots and comprising narrow adjusting portions to pass edgewise through the narrow connecting portions of said attaching slots to adjust the effective length of said securing chains.

7. The tire repair device comprising a pair of anchor plates curved to conform to the sides of the tire and each provided with a holding member adapted to be secured to the wheel rim adjacent the sides of a pneumatic tire, one at least of said anchor plates being formed with attaching slots provided with enlarged bearing apertures, securing chains, and attaching link members permanently connecting the ends of each of said securing chains to said anchor plates, said attaching link members comprising bearing portions coöperating with the bearing apertures in said attaching slots to adjust the effective length of said securing chains.

8. The tire repair device comprising a pair of anchor plates each provided with a holding device adapted to be secured to the wheel rim adjacent the sides of a pneumatic tire, one at least of said anchor plates being formed with substantially closed attaching slots provided with bearing apertures, securing chains, and attaching members connecting each of said securing chains to said anchor plates, said attaching members comprising bearing portions coöperating with the bearing apertures in said attaching slots to adjust the effective length of said securing chains.

FREDERICK A. STRONG.

Witnesses:
W. M. WHEELER,
E. F. VON WETTBERG.